United States Patent
Paepcke et al.

(10) Patent No.: US 11,453,129 B2
(45) Date of Patent: Sep. 27, 2022

(54) USER ASSISTING ROBOT FOR SHOPPING APPLICATIONS

(71) Applicant: Toyota Research Institute, Inc., Los Altos, CA (US)

(72) Inventors: Stephanie Paepcke, Mountain View, CA (US); Tiffany L. Chen, San Jose, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 527 days.

(21) Appl. No.: 15/873,166

(22) Filed: Jan. 17, 2018

(65) Prior Publication Data

US 2019/0217477 A1 Jul. 18, 2019

(51) Int. Cl.
 *B25J 9/00* (2006.01)
 *B25J 9/16* (2006.01)
 (Continued)

(52) U.S. Cl.
 CPC .......... *B25J 9/1697* (2013.01); *B25J 9/1679* (2013.01); *B25J 11/008* (2013.01); *B62B 3/1472* (2013.01);
 (Continued)

(58) Field of Classification Search
 CPC ...... B25J 9/1697; B25J 9/1679; B25J 11/008; G06Q 30/06; G05B 19/4189;
 (Continued)

(56) References Cited

U.S. PATENT DOCUMENTS 9,089,969 B1 7/2015 Theobald
9,715,674 B1 7/2017 Quan et al.
(Continued)

FOREIGN PATENT DOCUMENTS

CN 202453770 9/2012
CN 105598937 5/2016
(Continued)

OTHER PUBLICATIONS

Ishii, Kentaro et al., Designing Laser Gesture Interface for Robot Control, Image Analysis and Recognition, 11th International Conference, ICIAR 2014; Published: Aug. 24, 2009.
(Continued)

*Primary Examiner* — Ian Jen
(74) *Attorney, Agent, or Firm* — Dinsmore & Shohl LLP (57) ABSTRACT

A robot system includes a holding compartment configured to transport one or more items and an electronic control unit having a processor and a non-transitory computer readable memory including a machine-readable instruction set. The robot system further includes a camera for capturing image data of an environment of the holding compartment and a robotic arm each communicatively coupled to the electronic control unit. The machine-readable instruction set causes the processor to receive image data of the environment of the holding compartment from the camera, determine a set of handling instructions for an item collected by the robotic arm, determine a location within the holding compartment for placing the item collected by the robotic arm based on the image data of the environment of the holding compartment and the set of handling instructions, and manipulate the robotic arm to place the item within the holding compartment at the determined location.

20 Claims, 6 Drawing Sheets

(51) Int. Cl.
  *B25J 11/00* (2006.01)
  *G06K 7/10* (2006.01)
  *B62B 3/14* (2006.01)
  *G06F 3/01* (2006.01)
  *G05B 19/418* (2006.01)
  *G06Q 30/06* (2012.01)

(52) U.S. Cl.
  CPC ......... *G05B 19/4189* (2013.01); *G06F 3/017* (2013.01); *G06K 7/10861* (2013.01); *G06Q 30/06* (2013.01); *G05B 2219/40298* (2013.01); *G05B 2219/45048* (2013.01); *G05B 2219/45052* (2013.01)

(58) Field of Classification Search
  CPC ........... G05B 2219/45048; G05B 2219/40298; G05B 2219/45052; G06F 3/017; B62B 3/1472; G06K 7/10861
  See application file for complete search history.

(56) References Cited

U.S. PATENT DOCUMENTS

| | | | |
|---|---|---|---|
| 9,827,683 | B1 | 11/2017 | Hance |
| 2006/0116973 | A1* | 6/2006 | Okamoto .............. G05D 1/0274 706/16 |
| 2008/0118335 | A1 | 5/2008 | Ishida et al. |
| 2014/0180479 | A1 | 6/2014 | Argue et al. |
| 2016/0200340 | A1* | 7/2016 | Stankevitz .............. B62B 3/027 280/641 |
| 2016/0260161 | A1 | 9/2016 | Atchley et al. |
| 2016/0303737 | A1* | 10/2016 | Rossano ................ B25J 9/1656 |
| 2016/0364785 | A1* | 12/2016 | Wankhede ......... G06Q 30/0639 |
| 2016/0364786 | A1* | 12/2016 | Wankhede ........... G07G 1/0036 |
| 2017/0066592 | A1 | 3/2017 | Bastian et al. |

FOREIGN PATENT DOCUMENTS

| | | |
|---|---|---|
| CN | 106272478 | 1/2017 |
| JP | 03-095028 A | 4/1991 |
| JP | 2017210302 A | 11/2017 |
| WO | 2006059676 A1 | 8/2006 |

OTHER PUBLICATIONS

International Search Report and Written Opinion, dated May 28, 2019, PCT/US2019/013466.

"Design and Development of Smart Sales Robot for Supermarket" URL: http://www.iraj.in/journal/journal_file/journal_pdf/1-59-140188733645-49.pdf; Published/Access Date: Jun. 2014, vol. 2, Issue—6 Author(s): Siva Rama Krishna Nalluri, M.Sundarambal, S.Elango; Journal: International Journal of Electrical, Electronics and Data Communication.

'Here Come the Robot Shopping Carts, http://www.roboticstrends.com/article/here_come_the_robot_shopping_carts Published/Access Date: Jun. 30, 2016' Author: Steve Crowe.

Japanese Patent Office; Office Action for JP2020-539207; dated Aug. 30, 2021; 7 pgs.

Japanese Patent Office; Office Action for JP2020-539207; dated Apr. 28, 2022; 5 pgs.

* cited by examiner

USER ASSISTING ROBOT FOR SHOPPING APPLICATIONS

TECHNICAL FIELD

The present specification generally relates to robot systems and methods and, more specifically, robot systems and methods for collecting and placing items in a holding compartment automatically in response to a set of handling instructions for the item and image data of the holding compartment.

BACKGROUND

Shopping generally consists of collecting numerous items using a shopping cart or basket while walking up and down aisles of a store and placing items to be purchased in a shopping cart or a basket. Additionally, stores generally attempt to pack as many items in an aisle as possible to reduce the overall square footage of the store to ultimately keep product prices low. As a result, several issues arise. For the elderly or disabled shopper, many items are not reachable or are too hazardous to collect and place in their shopping cart or basket. Similarly, as many shoppers turn to more modern methods of shopping, such as purchasing items via online stores, there is a need to optimize the shopping experience in a store with many aisles and even more products.

Accordingly, a need exists for improved systems and methods for assisting a shopper with their in-store collection of items for purchase.

SUMMARY

In one embodiment, a robot system includes an electronic control unit and a holding compartment configured to transport one or more items. The electronic control unit includes a processor and a non-transitory computer readable memory including a machine-readable instruction set. The robot system further includes a camera for capturing image data of an environment of the holding compartment and a robotic arm each communicatively coupled to the electronic control unit. The machine-readable instruction set causes the processor to receive image data of the environment of the holding compartment from the camera, determine a set of handling instructions for an item collected by the robotic arm, determine a location within the holding compartment for placing the item collected by the robotic arm based on the image data of the environment of the holding compartment and the set of handling instructions, and manipulate the robotic arm to place the item within the holding compartment at the determined location.

In another embodiment, a robot system includes an electronic control unit and a holding compartment configured to transport one or more items. The electronic control unit includes a processor and a non-transitory computer readable memory including a machine-readable instruction set. The robot system further includes a camera communicatively coupled to the electronic control unit for capturing image data of an environment of a holding compartment and a robotic arm communicatively coupled to the electronic control unit and rotatably coupled to the holding compartment. Furthermore, the robot system includes a motorized base coupled to the robotic arm and the holding compartment. The machine-readable instruction set causes the processor to receive image data of the environment of the holding compartment from the camera, receive image data of an item to be collected from the camera, determine a set of handling instructions for the item based on the image data of the item received from the camera, determine a location within the holding compartment for placing the item collected by the robotic arm based on the image data of the environment of the holding compartment and the set of handling instructions, and manipulate the robotic arm to place the item within the holding compartment at the determined location.

In another embodiment, a method for storing an item includes receiving image data from a camera of an environment of a holding compartment and determining a set of handling instructions for an item collected by a robotic arm. The method further includes determining a location within the holding compartment for placing the item collected by the robotic arm based on the image data of the environment of the holding compartment and the set of handling instructions, and manipulating the robotic arm to place the item at the determined location within the holding compartment.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein include robot systems and methods for shopping applications. Referring generally to the figures, the robot systems and methods include a camera, a robotic arm and a holding container. A machine-readable instruction set causes a processor to at least receive image data of the environment of the holding compartment from the camera, determine a set of handling instructions for an item collected by the robotic arm, determine a location within the holding compartment for placing the item collected by the robotic arm based on the image data of the environment of the holding compartment and the set of handling instructions, and manipulate the robotic arm to position the item within the holding compartment at the determined location. The various robot systems and methods for shopping applications will be described in more detail herein with specific reference to the corresponding drawings as example but not limiting embodiments.

Figure 1:
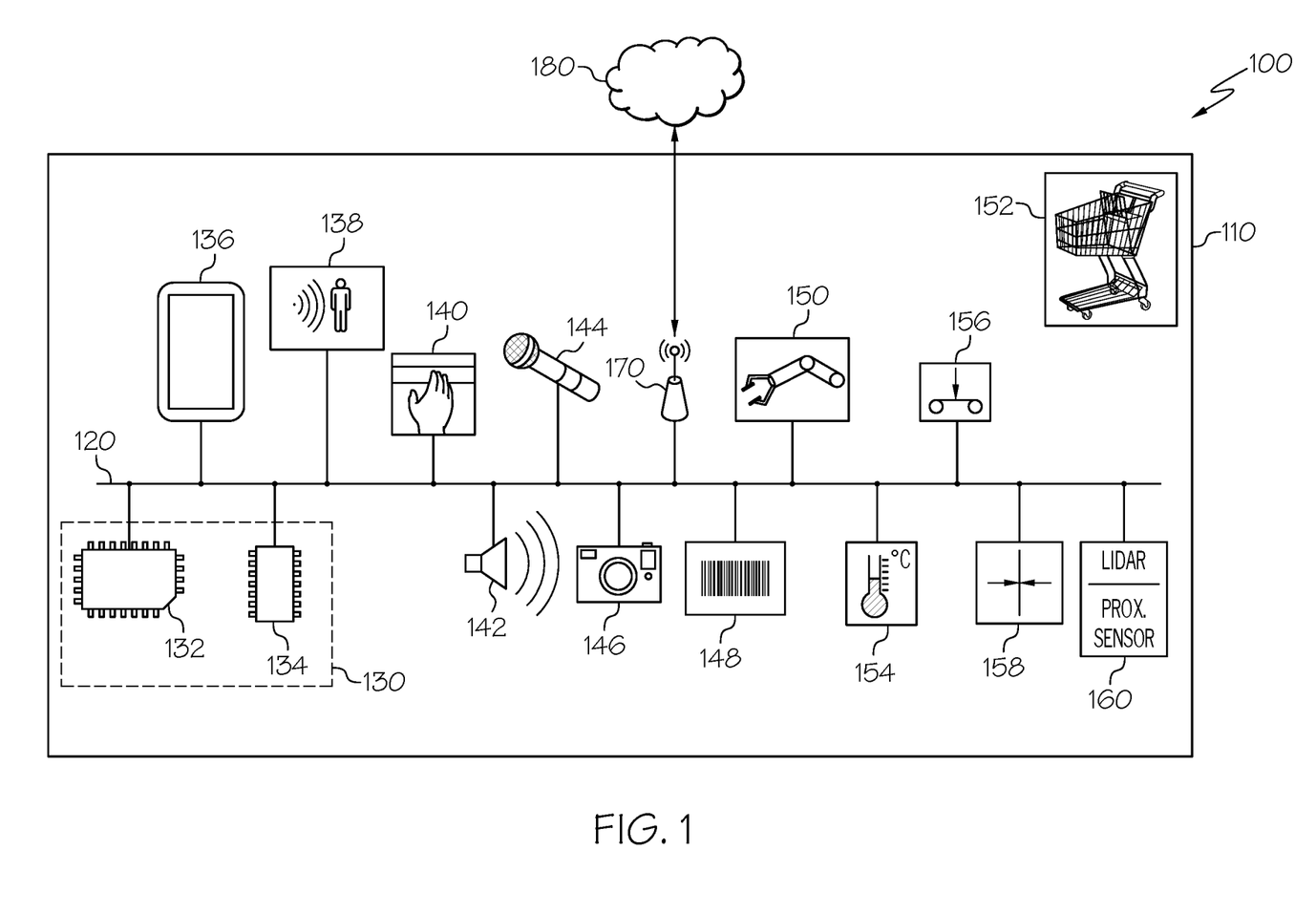
FIG. 1 schematically depicts components of a robot system according to one or more embodiments shown and described herein.

Turning now to the drawings wherein like numbers refer to like structures, and particularly to FIG. 1, a robot system 100 for shopping applications is depicted. The robot system 100 includes a robot 110. The robot 110 includes a communication path 120, an electronic control unit 130 comprising a processor 132 and a non-transitory computer readable memory 134, a display 136, a motion sensor 138, an input device 140, a speaker 142, a microphone 144, one or more cameras 146, a barcode scanner 148, a robotic arm 150, a temperature sensor 154, a weight sensor 156, a pressure sensor 158, a LIDAR system 160, and network interface hardware 170. The robot 110 is communicatively coupled to a network 180 by way of the network interface hardware 170. The components of robot 110 may be physical coupled together or may be communicatively and operably coupled through the communication path 120 and/or the network 180. The various components of the robot 110 and the interaction thereof will be described in detail below.

The communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the robot 110. As used herein, the term "communicatively coupled" means that coupled components are capable of exchanging signals with one another such as, for example, electrical signals via conductive medium, electromagnetic signals via air, optical signals via optical waveguides, and the like.

Still referring to FIG. 1, the electronic control unit 130 may be any device or combination of components comprising a processor 132 and non-transitory computer readable memory 134. The processor 132 of the robot 110 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the robot 110 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the embodiment depicted in FIG. 1 includes a single processor 132, other embodiments may include more than one processor 132.

The non-transitory computer readable memory 134 of the robot 110 is coupled to the communication path 120 and communicatively coupled to the processor 132. The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single non-transitory computer readable memory 134, other embodiments may include more than one memory module.

The robot 110 comprises a display 136 for providing visual output such as, for example, displaying a shopping list, a location of an item, coupons, advertisements, or other various status, control or communications related to the robot 110. The display 136 is coupled to the communication path 120. Accordingly, the communication path 120 communicatively couples the display 136 to other modules of the robot 110. The display 136 may include any medium capable of transmitting an optical output such as, for example, a cathode ray tube, light emitting diodes, a liquid crystal display, a plasma display, or the like. Moreover, the display 136 may be a touchscreen that, in addition to providing optical information, detects the presence and location of a tactile input upon a surface of or adjacent to the display 136. Accordingly, each display 136 may receive mechanical input directly upon the optical output provided by the display 136. Additionally, the display 136 may be the display 136 of a portable personal device such as a smart phone, tablet, laptop or other electronic device. Furthermore, the display 136 may be integrated into a holding compartment 152, (e.g., the holding compartment 315 of FIG. 3). In an embodiment where the holding compartment 152 is a holding compartment of a shopping cart, the display 136 may be coupled to a handle or another portion of the shopping cart viewable and accessible to a user. Additionally, it is noted that the display 136 can include one or more processors and one or more non-transitory computer readable memories. While the robot 110 includes a display 136 in the embodiment depicted in FIG. 1, the robot 110 may not include a display 136 in other embodiments.

Still referring to FIG. 1, a motion sensor 138 may be any device or combination of components capable of detecting movement and generating an output signal indicative of the motion detected. The motion sensor 138 may comprise an optical sensor, acoustic sensor, microwave sensor or other electromagnetic sensor and a transmitter to generate a corresponding signal capable of detection by the sensor. Changes in the optical acoustic, microwave or other electromagnetic field in the motion sensors 138 proximity are interpreted by the communicatively coupled electronic control unit 130 or a separate controller for signal processing. Some example motion sensors 138 include passive or active infrared (AIR/PIR), microwave, ultrasonic, tomographic motion detection, video camera systems and software, and gesture detectors.

In some embodiments, the motion sensor 138 is a passive infrared based motion sensor system that is sensitive to variations in temperature by detecting black body radiation and tracking changes in a temperature profile. In some embodiments, the motion sensor 138 is part of an active infrared based motion sensor system that includes an infrared emitter. In some embodiments, the active infrared emitter may project a pattern of infrared light so that the detector may map or track variations in the pattern. An example system may include an infrared laser projector combined with a complementary metal oxide semiconductor (CMOS) sensor, such as is used in a Kinect™ optical sensor sold by Microsoft Corporation of Redmond, Wash. In some embodiments, the motion sensor 138 captures video data in three dimensions (3D) under ambient light conditions and is adapted to determine depth of an object and movement. Such systems may also be used to implement gesture detection. Gesture detection may include using IR detectors or photodetectors and infrared lighting elements along with an electronic control unit 130 for detecting hand motions and gestures. In some embodiments, the gestures may correspond to commands to the robot 110. Examples of gesture control will be described below.

Still referring to FIG. 1, the input device 140 is coupled to the communication path 120 and communicatively coupled to the processor 132. The input device 140 may be any device capable of transforming user contact into a data signal that can be transmitted over the communication path 120 such as, for example, a button, a lever, a switch, a knob, a touch sensitive interface, a microphone or the like. In some embodiments, the input device 140 includes a lever for activating the turn signal, a power button, a volume button, an activation button, a scroll button, or the like. In some embodiments, the input device 140 includes a pressure sensor, a touch-sensitive region, a pressure strip, or the like. It should be understood that some embodiments may not include the input device 140 or may include more than one input device 140.

The speaker 142 (i.e., an audio output device) is coupled to the communication path 120 and communicatively coupled to the processor 132. The speaker 142 transforms audio message data as signals from the processor 132 of the electronic control unit 130 into mechanical vibrations producing sound. For example, the speaker 142 may be used to communicate from the robot 110 to a user. However, it should be understood that, in other embodiments, the robot 110 may not include the speaker 142.

The microphone 144 is coupled to the communication path 120 and communicatively coupled to the processor 132. The microphone 144 may be any device capable of transforming a mechanical vibration associated with sound into an electrical signal indicative of the sound. The microphone 144 may be used to capture verbal commands to the robot 110. It should be understood that some embodiments may not include the microphone 144.

Still referring to FIG. 1, one or more cameras 146 are coupled to the communication path 120 and communicatively coupled to the processor 132. The one or more cameras 146 may be any device having an array of sensing devices (e.g., pixels) capable of detecting radiation in an ultraviolet wavelength band, a visible light wavelength band, or an infrared wavelength band. The one or more cameras 146 may have any resolution. The one or more cameras 146 may be an omni-directional camera, or a panoramic camera. In some embodiments, one or more optical components, such as a mirror, fish-eye lens, or any other type of lens may be optically coupled to each of the one or more cameras 146. In embodiments described herein, the one or more cameras 146 may provide image data to the electronic control unit 130 of the environment around the robot 110 and/or of the holding compartment 152 and any items stored within. For example, the one or more cameras 146 may be positioned on the robotic arm 150 to serve as an eye for the robotic arm 150 in navigating space, capturing image data of items and the holding compartment 152 or receiving visual commands from a user. In some embodiments, the one or more cameras 146 may be positioned at various locations on the holding compartment 152 for viewing the contents within or the surrounding environment. The one or more cameras 146 may also provide navigation support for embodiments where the robot 110 may operate autonomously or semi-autonomously.

In operation, the one or more cameras 146 capture image data and communicate the image data to the electronic control unit 130. The image data may be received by the processor 132, which may process the image data using one or more image processing algorithms. Any known or yet-to-be developed video and image processing algorithms may be applied to the image data in order to identify an item, determine an items location relative to the holding container and other items or even more generally environmental objects for use during navigation of the robotic arm 150 and/or the robot 110. Example video and image processing algorithms include, but are not limited to, kernel-based tracking (mean-shift tracking) and contour processing algorithms. In general, video and image processing algorithms analyze may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

In some embodiments, the robot 110 may include a barcode scanner 148 communicatively coupled to the electronic control unit 130. The barcode scanner 148 may be any device capable of converting a barcode, either linear, 2D, pictorial or other, into an electronic signal for decoding by an electronic control unit 130 or processor 132. Typically a barcode scanner 148 emits a wavelength of light and detects the reflections to determine a profile of the barcode which is then decoded. Some barcode scanners may include using image data captured from one or more cameras 146 which is processed using image processing techniques. In some embodiments, a barcode scanner 148 or the one or more cameras 146 communicate signals indicative of the barcode of the item to the electronic control unit 130 and the electronic control unit 130 then determines the identify a product and adds the item to an electronic checkout list in the non-transitory computer readable memory 134. The electronic checkout list may be communicated to a cashier or other means for checking out such that each item in the holding compartment 152 does not need to be removed, scanned and replaced at time of checkout.

In some embodiments, it may be necessary for a robotic arm 150 to determine a specific product from a shelf of various products using the barcode in order to correctly collect the intended product from the shelf or storage location. In some embodiments, however, the image data captured by the one or more cameras 146 may be analyzed by the electronic control unit 130 to determine the identity of the item. Subsequently, information regarding the item such as price, inventory amount, and even the set of handling instructions for the item may be determined by accessing a locally stored database or connecting to a remote database through the network interface hardware 170. Additionally, scanning a barcode with a barcode scanner 148 may allow the robot 110 to add an item to a checkout list as soon as the item is selected from the storage location and placed in the holding container.

Still referring to FIG. 1, a robotic arm 150 is coupled to the communication path 120 and communicatively coupled to the electronic control unit 130. The robotic arm 150 may comprise multiple mechanical segments linked together by servos, actuators or other types of joint forming a kinematic chain. One end of the robotic arm 150 may include an end effector for collecting items. An opposing end of the robotic arm 150 may be mounted to a holding compartment 152 (see e.g., FIG. 3). The electronic control unit 130 which is communicatively coupled to the robotic arm 150 provides commands in the form of signals to the robotic arm 150 to manipulate its movement. For example, the electronic control unit 130 using image data from the one or more cameras 146 may provide signals to the robotic arm 150 to navigate the end effector proximate an item, collect the item and then navigate the robotic arm 150 and end effector proximate a location in the holding container for placing the item. The robotic arm 150 is intended to simulate similar actions to that of a human arm and hand preforming similar activities.

Figure 3:
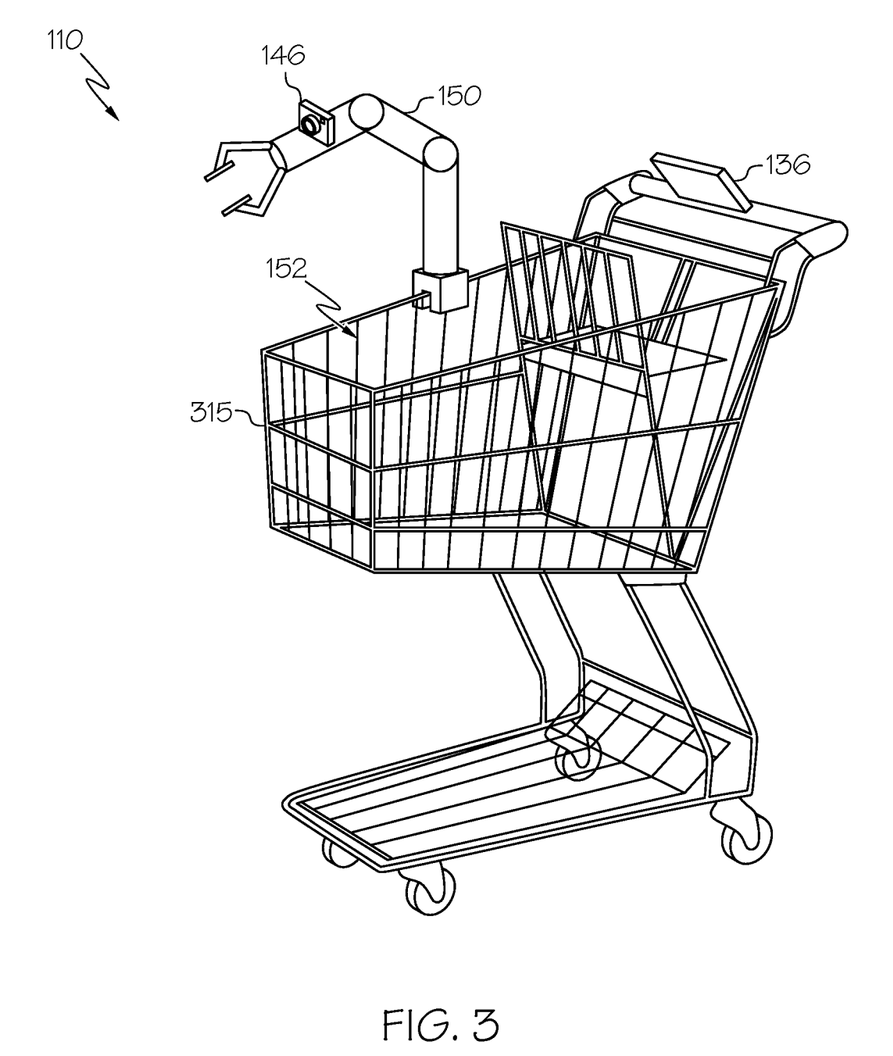
FIG. 3 is a view illustrating a robot comprising a typical shopping cart having a holding compartment with a robotic arm rotatably coupled to the holding compartment according to one or more embodiments shown and described herein.

In embodiments, the robot 110 includes a robotic arm 150 operably coupled to the holding compartment 152. In some embodiments, the holding compartment 152 may be an open storage compartment of a typical shopping cart having wheels (e.g., as depicted in FIG. 3), which may also include a handle for pushing. However, in some embodiments, the holding compartment 152 may take on other forms but maintain the ability to store items collected by the robotic arm 150. The holding compartment 152 may be configured as a single open container or may optionally have dividers configured within the open container space for placing items. For example, the holding compartment 152 may have a segment specifically configured for holding temperature controlled items such as cold items in order to maintain their temperature during transport. In one such embodiment, the holding compartment 152 may include an insulated portion. Additionally, the holding compartment 152 may include a shelf or slot for storing small items that may otherwise be lost among larger more bulky items. Moreover, a shelf or slot may be configured for storing and protecting fragile items such as egg, bread, produce and or the like. The holding compartment 152 may be further configured for separating household products from consumables. In general, the holding compartment 152 may be configured such that specific items may have a designated storage location with like items. In other embodiments, the holding compartment 152 may include removable storage bins or even be configured with shopping bags to reduce the need to bag groceries at checkout.

Referring again to FIG. 1, the robot 110 may further include a variety of sensors including but not limited to a temperature sensor 154, weight sensor 156 and pressure sensor 158. The temperature sensor 154 may be any device capable of outputting a temperature signal indicative of a temperature sensed by the temperature sensor 154. As non-limiting examples, the temperature sensor 154 may comprise a thermocouple, a resistive temperature device, an infrared sensor, a bimetallic device, a change of state sensor, a thermometer, a silicon diode sensor, or the like. The weight sensor 156 may be any device capable of outputting a weight signal indicative of the weight of an object, such as the weight of a grocery item collected by the robotic arm 150. Additionally, a pressure sensor 158 may be any device capable of outputting a pressure signal indicative of the amount of pressure applied to an object such as the amount of pressure being applied by an end effector of a robotic arm 150 on an item. The pressure sensor 158 may be used to calibrate the grip strength of an end effector in order to assure the item is securely held but not damaged by the robotic arm 150.

In some embodiments, the robot 110 may include a LIDAR system 160. The LIDAR system 160 may be any system capable of detecting and/or mapping an environment intended to be navigated. In such embodiments, the LIDAR system 160 is communicatively coupled to the communication path 120 and the electronic control unit 130. A LIDAR system 160 or light detection and ranging system uses pulsed laser light to measure distances from the LIDAR system 160 to objects that reflect the pulsed laser light. A LIDAR system 160 may be made of solid-state devices with few or no moving parts, including those configured as optical phased array devices where its prism-like operation permits a wide field-of-view without the weight and size complexities associated with a traditional rotating LIDAR system 160. The LIDAR system 160 is particularly suited to measuring time-of-flight, which in turn can be correlated to distance measurements with objects that are within a field-of-view of the LIDAR system 160. By calculating the difference in return time of the various wavelengths of the pulsed laser light emitted by the LIDAR system 160a digital 3-D representation of a target or environment may be generated. The pulsed laser light emitted by the LIDAR system 160 may in one form be operated in or near the infrared range of the electromagnetic spectrum, with one example having emitted radiation of about 905 nanometers. Sensors such as a LIDAR system 160 can be used by the robot 110 to provide detailed 3-D spatial information for the identification of objects near the robot 110, as well as the use of such information in the service of systems for mapping, navigation and autonomous operations, especially when used in conjunction with geo-referencing devices such as GPS or a gyroscope-based inertial navigation unit (INU, not shown) or related dead-reckoning system, as well as non-transitory computer readable memory 134 (either its own or memory of the electronic control unit 130). Some embodiments may include a proximity sensor system other than or in addition to the LIDAR system 160.

In some embodiments, the LIDAR system 160 may be interpolated with the image data from the one or more cameras 146 to generate or refine a simulated model of the environment around the robot 110. In embodiments, the simulated model may be independently generated from the image data. Additionally, other sensor systems and mapping systems such as radar, inertial measurement units (IMU) and the like may be implemented to provide additional data to the electronic control unit 130 for processing image data to determine objects and sources of light in the environment of the robot 110.

The network interface hardware 170 is coupled to the communication path 120 and communicatively coupled to the electronic control unit 130. The network interface hardware 170 may be any device capable of transmitting and/or receiving data via a network 180. Accordingly, network interface hardware 170 can include a communication transceiver for sending and/or receiving any wired or wireless communication. For example, the network interface hardware 170 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 170 includes hardware configured to operate in accordance with the Bluetooth wireless communication protocol. In another embodiment, network interface hardware 170 may include a Bluetooth send/receive module for sending and receiving Bluetooth communications to/from a network 180. The network interface hardware 170 may also include a radio frequency identification ("RFID") reader configured to interrogate and read RFID tags.

In some embodiments, the robot 110 may be communicatively coupled to the network 180. In some embodiments, the network 180 is a personal area network that utilizes Bluetooth technology to communicatively couple the robot 110 with a grocery inventory and management server, a robot control server system, a personal device of a user or any other network connectable device. In other embodiments, the network 180 may include one or more computer networks (e.g., a personal area network, a local area network, or a wide area network), cellular networks, satellite networks and/or a global positioning system and combinations thereof. Accordingly, the robot 110 can be communicatively coupled to the network 180 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The following sections will now describe embodiments of the operation of the robot 110 and methods for shopping applications. In some embodiments, the robot 110 comprises an electronic control unit 130 having a processor 132 and a non-transitory computer readable memory 134, one or more cameras 146 and a robotic arm 150 communicatively and operably coupled to the electronic control unit 130. The robot 110 further includes a holding compartment 152. In some embodiments, the robot 110 includes additional sensors and systems as described herein.

Figure 2:
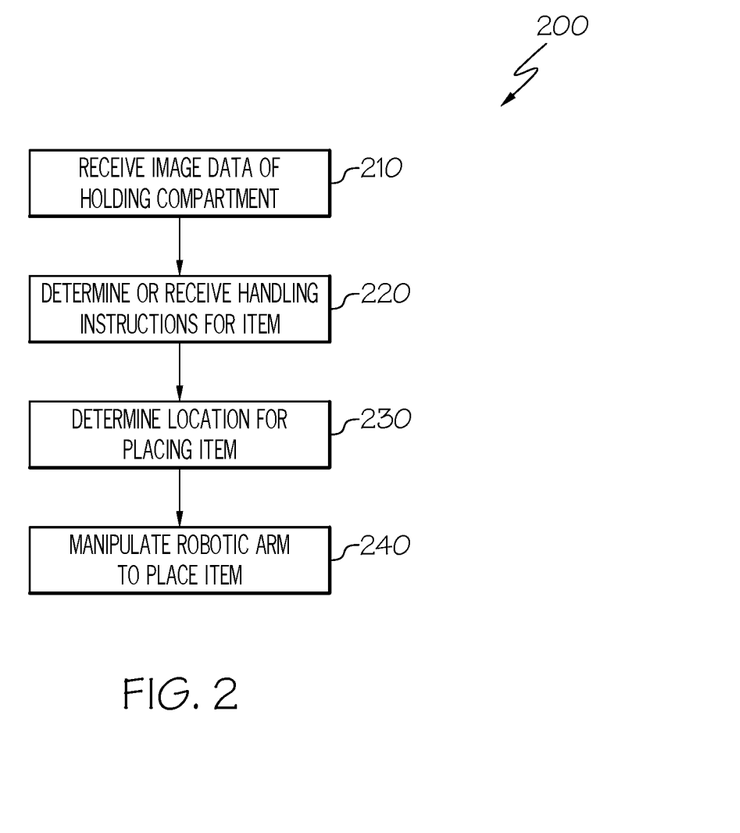
FIG. 2 is a flowchart depicting a method for a robot system for shopping applications according to one or more embodiments shown and described herein.

Referring now to FIG. 2, a flowchart 200 of a method for shopping applications is depicted. The flowchart 200 depicted in FIG. 2 is a representation of a machine-readable instruction set stored in the non-transitory computer readable memory 134 and executed by the processor 132 of the electronic control unit 130. The process of the flowchart 200 in FIG. 2 may be executed at various times and in response to signals from the sensors communicatively coupled to the electronic control unit 130. Additional or alternative steps may be implemented to achieve the same result of assisting a user with shopping application without deviating from the scope of this disclosure.

While a focus of the flowchart 200 depicted in FIG. 2 relates to collecting and placing an item in a holding compartment 152, the robot 110 may include additional operational steps which will be discussed along with the specifics steps highlighted in the flowchart 200. In step 210, a robot 110 may receive image data of the holding compartment 152 from one or more cameras 146 communicatively coupled to the electronic control unit 130. The one or more cameras 146 may be disposed on the robotic arm 150, the holding compartment 152 or another apparatus configured to at least view the contents of the holding compartment 152. Image data of the contents within the holding compartment 152 depict what items are currently in the holding compartment 152, the location of the items in the holding compartment 152, the structure of the holding compartment 152 and other related attributes. The image data of the holding compartment 152 may be continually updated to account for the addition of items, the removal of items and any shifting of items within the holding compartment 152. In some embodiments, prior to the robotic arm 150 collecting an item from a storage location the electronic control unit 130 may receive updated image data of the holding compartment 152.

In step 220, the robot 110, or more specifically the electronic control unit 130 of the robot 110, determines or receives a set of handling instructions for an item. In some embodiments, the electronic control unit 130 may receive a set of handling instructions for the item from a communicatively connected database. In such instances, the robot 110 first needs to identify the item and either request the set of handling instructions from a connected database or lookup the set of handling instructions from the non-transitory computer readable memory 134. In either case the item may be identified through image data captured by the one or more cameras 146 or by scanning the barcode of the item with the barcode scanner 148. In some embodiments, the item may be identified from the location at which the item is stored. In some embodiments, the item is collected by the robotic arm 150 (e.g., in response to receiving instructions from the user to grasp or retrieve the item with the robotic arm 150) or within the environment of the robot 110 and reachable by the robotic arm 150.

The set of handling instructions may correspond to attributes of an item such as its weight, volume, dimensions, mechanical details specific to the packaging of the item, for example, material composition, compressive strength, impact resistance, water resistance, or the like. In some embodiments, attributes of an item may be utilized by the robot 110 to determine one or more handling instructions for physically storing an item on, under, or next to other items. For example, a handling instruction for a pack of eggs may state that no item that has a weight greater than the compressive strength of the packaging may be placed on top of the pack of eggs. Similarly, items having generally large volumes, for example, an item with a volume similar to that of a 12 pack of paper towels may include a handling instruction requiring the item to be stored on the bottom of a holding compartment.

The set of handling instructions may also correspond to other attributes of an item such as classifications, for example, whether the item is a food, a beverage, a household item, a tool or the like. Each classification of an item may define one or more handling instructions that make up the set of handling instructions for an item. That is, classifications may include one or more handling instructions such as a handling or storage temperature, whether the item is raw or cooked such that it be stored only with like items, and whether the item should be kept away from any other specific items. For example, a handling instruction may state that raw meat should not be stored or placed near cooked or packaged items. Similarly, a handling instruction for household classified goods may include a handling instruction stating that it should be stored away from all items classified as a food or a beverage. Other handling instructions may be discernable by those skilled in the art which may improve the handling and storage of items in the holding compartment 152.

In some embodiments, the set of handling instructions may be determined by the robot 110 based on visual inspection of the item and/or interacting with the item. For example, in some embodiments, the one or more cameras 146 may collect image data of the item. The image data may be processed by the electronic control unit 130 to determine physical characteristics of the item such as the items dimensions, volume, or the like. In some embodiments, the robot 110 may interact with the item with the end effector and various sensors to determine additional attributes of the product. For example, the end effector may collect data regarding the items temperature using a temperature sensor 154 disposed or integrated in the end effector. Similarly, the end effector may be configured to determine a compression strength of the item using a pressure sensor 158 and even the weight of the item using a weight sensor 156. The robot 110 may be configured with additional sensor and systems to determine further attributes not available from a database or unknown about the item that may affect the storage of the item in the holding compartment 152.

Once the robot 110 has received image data of the holding compartment 152 during step 210 and determined or received the set of handling instructions for the item collected by the robotic arm 150 during step 220, the robot 110 will determine a location within the holding compartment 152 for placing the item collected by the robotic arm 150 in step 230. The robot 110 may determine a location for placing the item collected by the robotic arm 150 through a variety of methods. In some embodiments, the robot 110 may determine the location for placing the item collected by the robotic arm based on at least the image data of the holding compartment 152 and the set of handling instructions. From the image data, the electronic control unit 130 may determine the configuration and dimensions of the holding compartment 152, the presence of any items currently in the holding compartment 152, portions of the holding compartment 152 not occupied by items, and portions of the holding compartment 152 occupied by items. For example, to determine the aforementioned items and portions, the image data may be processed by the electronic control unit 130 or an independent image processing unit. In some embodiments, image processing may include applying algorithms such as image segmentation, depth mapping, saliency, object recognition, detection and identification or the like. Image processing or as it is also known, computer vision, may produce labeled image data. The labeled image data may include pixel level data which includes the identification of an item and/or the associated set of handling instructions. In some embodiments, the electronic control unit 130 may generate a mathematical representation (e.g., a 3D model) of the holding compartment 152 from the image data with areas and volumes specified through a coordinate system. The areas and volumes may further be labeled as a specific item, group of items, or empty space within the holding compartment 152. Additionally, each area and volume may include the references to the set of handling instructions for each item.

Based on the image data, the electronic control unit 130 may then determine one or more portions of the holding compartment 152 where an item collect by the robotic arm 150 may physically be placed. For example, the electronic control unit 130 may receive or otherwise determine the dimensions of the item collected and determine where that item will physically fit within the holding compartment 152. However, concurrently or at least before determining a location for the item within the holding compartment 152, the electronic control unit 130 may compare the set of handling instructions for the item collected by the robotic arm 150 with the set of handling instructions of the one or more items in the holding compartment 152 that would be adjacent and/or under the item collected by the robotic arm 150. In some embodiments, the robot 110 determines a location to place the item collected by the robotic arm 150 based on the comparison of the set of handling instructions of an item to be placed in the holding compartment 152 with the set of handling instructions for items already in the holding compartment 152. In some embodiments, the set of handling instructions provide a set of rules and parameters related to the placement and storage of the item with respect to other items currently within the holding compartment 152 or even future items.

As described above, when placing a new item in the holding compartment 152, the electronic control unit 130 may determine the location the item collected by the robotic arm 150 is to be placed in the holding compartment 152 based on where the item will physically fit, the set of handling instructions for the new item, and/or the set of handling instructions for each of the items already in the holding compartment 152. For example, if a pack of eggs are present in the holding compartment 152 and the set of handling instructions includes a rule against placing anything on top of the pack of eggs, then the electronic control unit 130 will identify the space above the eggs as a location where the new item to be placed in the holding compartment may not be placed. However, such a rule may be further refined to state that no product over a certain weight may be placed on top of the pack of eggs. In such a case, the electronic control unit 130 may assign a weight restriction to the space above the pack of eggs.

In some embodiments, for example, the electronic control unit 130 may determine, from the image data, one or more locations where the item may physically be placed within the holding compartment 152. Then, the electronic control unit 130 may compare the set of handling instructions of the items adjacent to the one or more identified locations with the set of handling instructions for the item to be placed in the holding compartment 152. More specifically, if a gallon of milk is determined to physically fit on top of a pack of eggs or next to a tub of ice cream on the bottom of the holding compartment, but the set of handling instructions for the pack of eggs includes a weight limit, which the gallon of milk exceeds and there are no restrictions for placing the gallon of milk next to the tub of ice cream on the bottom of the holding compartment based on comparing the set of handling instruction for both, then the gallon of milk will be placed next to the tub of ice cream on the bottom of the holding compartment.

As another example, a pack of raw hamburger may be in the holding container and the set of handling instructions associated with the pack of raw hamburger may include a rule that states no produce or any cooked foods be placed adjacent to or on the pack of raw hamburger. For example, the electronic control unit 130 may label the planes that define the areas and/or volumes adjacent to the pack of raw hamburger, as identified from the image data, with a restriction against the placement of produce or any cooked foods. As a result, future items which fail to comply with the restriction based on the set of handling instructions for the pack of raw hamburger will not be placed adjacent to the pack of raw hamburger.

In some embodiments, the set of handling instructions may include rules and parameters regarding optimal storage temperatures. As such, in some embodiments items within a determined range of temperatures may be positioned near each other in order to maintain or reduce their increase or decrease in temperature. For example, milk, ice cream, and frozen pizza may be positioned adjacent to one another to maintain their low storage temperatures whereas prepared meal items such as a rotisserie chicken and fresh pasta may likewise be positioned adjacent each other to maintain their warm temperatures. Additionally, in some embodiments, the holding compartment 152 may include portions designed to store warm, cold, and/or room temperature items. For example, a cooler section may be provided that insulates cold items from warmer environmental temperatures or warm items placed in the same holding compartment 152. Likewise, a foil lined compartment or similarly insulated portion of the holding compartment 152 may be provided to keep warm items warm. The cooler section or insulated portion for keeping items warm may be passive or active. In some embodiments, the cooler section may include a condenser which actively cools the environment of the cooler section. The cooler section may further include cold packs or dry ice positioned to passively cool the environment of the cooler. Similarly, the insulated portion for keeping items warm may include a heat source configured to warm the environment of the insulated portion.

Once the electronic control unit 130 determines a location within the holding compartment 152 for placing the item collected by the robotic arm 150 in step 230, the electronic control unit 130, in step 240, may generate signals to manipulate the robotic arm 150 to place the item in the determined location. The electronic control unit 130 may be communicatively coupled to the servos, actuators, or other electromechanical devices linking the multiple mechanical segments of the robotic arm 150 together in a kinematic chain. The electronic control unit 130 may provide signals directly to each of the electromechanical devices or in some embodiments to a robotic motor drive and control system communicatively coupled to the robotic arm 150 for controlling the operation of the robotic arm 150.

When a new item is placed within the holding compartment 152, a collected item inventory list for the holding compartment 152 may be updated. The collected item inventory list may be stored in the non-transitory computer readable memory 134 of the electronic control unit 130 or a device connected via the network 180. The collected item inventory list may include more than just an identifier for the item added to the holding compartment 152. The collected item inventory list may also include parameters relating to the position of the item within the holding compartment 152 and the set of handling instructions associated with the item. For example, in some embodiments the holding compartment 152 and each item may be electronically defined with a Cartesian coordinate system. By defining the holding compartment 152 and each item with the Cartesian coordinate system or a similar plotting system the electronic control unit 130 is able to define volumes or portions of the holding compartment 152 that are occupied with an item or are void of an item. Additionally, with information from the collected item inventory list the electronic controller may improve the accuracy of identifying items and determining their position in the holding compartment 152.

Referring now to FIGS. 3-7, several example embodiments of robots and various components are depicted. FIG. 3 depicts an embodiment based on a typical shopping cart 315 having a holding compartment 152 with a robotic arm 150 rotatably coupled to the holding compartment 152. Additionally, one or more cameras 146 is disposed on the robotic arm 150 and a display 136 is coupled to the shopping cart 315. In some embodiments, the shopping cart 315 may be manually navigated around a shopping center by a user. The robotic arm 150, using the image data captured by the one or more cameras 146 to maneuver, may collect items from a storage location and place them in the holding compartment 152 as disclosed herein. The display 136 may optionally provide a variety of information and control to the user. For example, the display 136 may provide a graphical user interface (GUI) where the user may input or upload a shopping list containing one or more items. In some embodiments, the display 136 may then provide a map of the store and overlay the location of the items on the shopping list and optionally a route between each item so the user may navigate to each of the items on the shopping list. As the robot 110 approaches a location of an item on the shopping list, the display 136 may provide specific navigation instructions to the user for positioning the shopping cart 315 so the robotic arm 150 may maneuver to collect the item and place the item in the holding compartment 152 at a location determined based on the handling instructions as described herein. In other embodiments, the electronic control unit 130 may determine an order for collecting the items of the shopping list based on the set of handling instructions for each of the items of the shopping list and provide the user with the suggested order.

In some embodiments, the display 136 may provide an interface for a user to directly control the functionality of the robotic arm 150. For example, a user may manually operate the robotic arm 150 to collect items from a location unreachable by the user or items that are too awkward or heavy to move. Once the robotic arm 150 collects the item it may automatically store the item in the holding compartment 152. Furthermore, in some embodiments, in the absence of inputting a shopping list the robotic arm 150 may receive instructions from a user about what items to collect as the user navigates the shopping cart 315 and the robotic arm 150 past various items. In some embodiments, the camera 146 may capture image data of items on a shelf or in a storage location and share those images with a user through the display 136 or a network 180 connected device such as a smartphone or laptop. The user may then virtually select an item depicted in the image data and the robotic arm 150 may automatically maneuver to collect the item and place the item in the holding compartment 152.

In some embodiments, the robotic arm 150 may also receive instructions based on a gesture made by a user. A gesture may be a physical movement from a user intended to provide a command to the robot 110. The electronic control unit may analyze the image data of a gesture to determine the meaning of the gesture. For example, the one or more cameras 146 or gesture detector may detect a user pointing at an item to collect. Based on the pointing gesture the electronic control unit may generate one or more signals for controlling and maneuvering the robotic arm in response to the gesture. For example, the robotic arm 150 may maneuver to collect the item indicated from the pointing gesture and then store the item in the holding compartment 152. In other embodiments, gesture commands may also include verbal prompts received through a communicatively coupled microphone 144, which provide a verbal command to the electronic control unit 130 to be associated with a physical action detected by a motion sensor 138, one or more cameras 146 or other sensor configured to detect a gesture. For example, the pointing gesture may also include a verbal prompt such as "look at" or "pick up." When a physical action such as pointing in a direction with a hand is conduct in combination with the verbal command "look at" the robotic arm 150 may simply maneuver the one or more cameras 146 disposed thereon to view in the direction of the pointing gesture. Similarly, when a physical action such as pointing in a direction with a hand is conduct in combination with the verbal command "pick up" the robotic arm 150 may maneuver to collect the item indicated by the pointing gesture. In some embodiments, the gesture detector or the one or more cameras 146 used to capture physical gestures of a user may be separate from the one or more cameras 146 disposed on the robotic arm 150. In those embodiments, the one or more cameras 146 may include vision tracking software to track the position of the user so that physical gestures are not missed.

In some embodiments, the shopping cart 315 may include a motorized base, which can maneuver the holding compartment 152 and the robotic arm 150 without the need for a user to manually push the shopping cart 315. For example, the wheels of the shopping cart 315 may be coupled to motors that drive forward, reverse and turning motion of the holding compartment 152 and robotic arm 150. In some embodiments, the a network 180 connected device or gesture control system may be provided for remotely maneuvering the motorized base of the holding compartment 152 and the robotic arm 150. For example, a display 136 of a portable device may be configured to provide touch controls configured to manipulate the motorized base and robotic arm 150 in response to the inputs. The electronic control unit 130 may generate electrical signals and communicate the electrical signals to motorized base to facilitate semi-autonomous or autonomous operation. In an embodiment, the display 136 may include a view from the one or more cameras 146 disposed on the robotic arm 150 of items in a storage location. For example, the robotic arm 150 may maneuver to collect the item associated with the item virtually selected by touching the display 136 configured with a touch input corresponding to the image data on a display 136.

While semi-autonomous interaction may be possible through the use of network 180 connected remote control devices and gesture control systems, in some embodiments, the robot 110 for shopping applications may autonomously navigate and collect items throughout a store or storage facility and optimize the collection route and/or bagging of the items in the holding compartment 152. In such embodiments, a robot 110 having a holding compartment 152 and a robotic arm 150 with a motorized base may include a variety of sensors such as, motion sensors 138 and LIDAR system 160. The robot 110 may also include network interface hardware 170 connected to one or more devices for navigating from one location to another location.

In some embodiments, a user may create an electronic shopping list which is uploaded directly to a robot 110 or to a network 180 connected computing device in communication with the robot 110. Based on the contents of the shopping list and optionally the set of handling instructions for each item on the shopping list, a shopping route may be planned and optimized to collect the items in an order which may optimize the storage of the items in the holding compartment 152. For example, the shopping route may be planned and optimized to collect the fragile or delicate items after the larger, heavier, and/or more bulky items are collected and stored in the holding compartment 152. That is, for example, if eggs and bread are included on a shopping list with milk and canned foods, then the shopping route may be optimized to collect the milk and canned foods before the eggs and bread. Additionally, the shopping list may further optimize the route based on the ideal storage temperature of the items on the shopping list. For example, the route may be planned and optimized to collect items which are not normally stored at or near room temperature after room temperature items such as cereal, paper products, canned foods or the like are collected and stored. This may minimize the exposure of the items to environments that are not temperature controlled for as short as time as possible.

While the aforementioned embodiments focus on the robotic arm 150 collecting and placing items within the holding container to efficiently and automatically collect items for a user, the use of the robotic arm 150 is not the exclusive means for collecting and placing items in the holding compartment 152. In some embodiments, the robotic arm 150 may only supplement a user's shopping activities. That is, a user may also manually collect and add items to the holding compartment 152. While this may reduce the efficiency and optimization of placing items in the holding compartment 152, the robot may recognize the introduction of a new item in the holding compartment 152 upon subsequent image data captured by the one or more cameras 146 and adjust the placement of future items accounting for the user added items. Additionally, in some embodiments, if a user manually adds an item to the holding compartment 152 the display 136 on the holding compartment 152 or on a network 180 connected device may prompt the user to identify the item and where the item was placed within the holding compartment 152. In response, the electronic control unit 130 may provide a response to the user recommending an alternate storage location should the storage location conflict with a set of handling instructions for that item or an adjacent item.

Figure 4A:
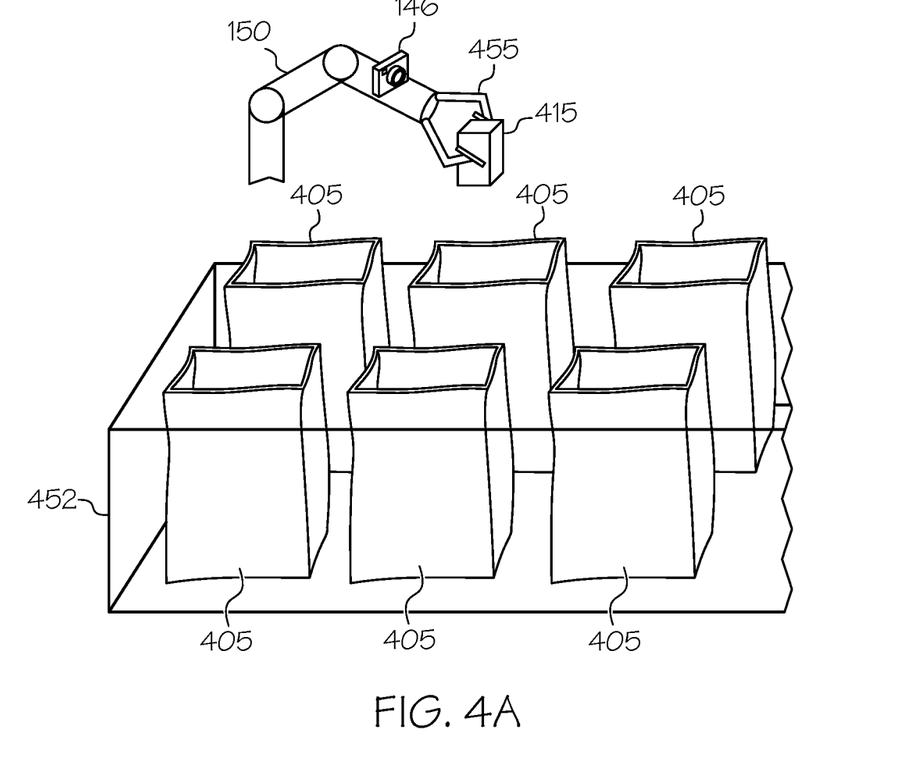
FIG. 4A is a view illustrating a holding compartment comprising a plurality of grocery bags according to one or more embodiments shown and described herein.

Referring now to FIGS. 4A-7, a variety of holding compartment configurations are depicted. FIG. 4A depicts a portion of a holding compartment 452 comprising a plurality of grocery bags 405 disposed within. Furthermore, FIG. 4A depicts a robotic arm 150 with one or more cameras 146 disposed thereon and an end effector 455 coupled to the robotic arm 150 holding an item 415. FIG. 4A represents an embodiment in which the holding compartment 452 includes a plurality of grocery bags 405, which the electronic control unit may identify from the image data captured by the one or more cameras 146. In operation, the robot with the robotic arm 150 may directly bag an item 415 collected by the end effector 455. In such an embodiment, the electronic control unit may apportion the holding compartment 452 into multiple holding compartments comprising the volume of each of the plurality of grocery bags 405. In order to avoid having to unbag the groceries at a checkout, the robot may also be configured with a barcode scanner 148, which scans the item as it is collected from the storage location and added to a checkout list stored in the non-transitory computer readable memory of the electronic control unit or on network 180 connected device. In some embodiments, the identification and/or scanning of the barcode of an item may be accomplished through barcode image recognition software that analyzes image data captured by the one or more cameras 146.

Figure 4B:
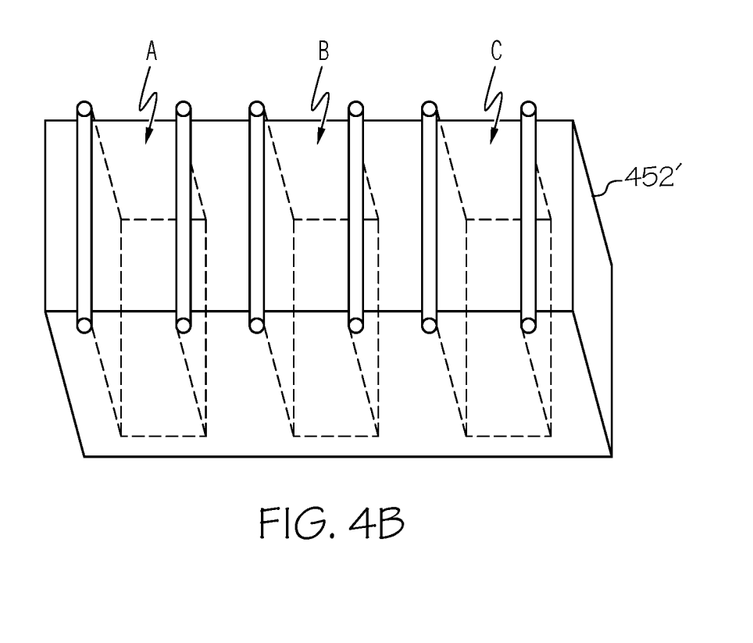
FIG. 4B is a view illustrating another holding compartment comprising a plurality of collapsible grocery bags according to one or more embodiments shown and described herein.

Referring to FIG. 4B, another embodiment of a holding compartment 452' having removable storage bags A, B, and C is depicted. In this embodiment, the holding compartment 452' includes removable storage bags A, B, and C configured to span across the holding compartment 452' widthwise and optionally collapse together and open as additional bags are needed for storing items 415 collected by the robotic arm 150. In embodiments such as those depicted in FIGS. 4A-4B where the holding compartment includes a plurality of grocery bags, the robot may also preform the function of bagging the groceries thus reducing the amount of handling and time required at checkout.

Figure 5:
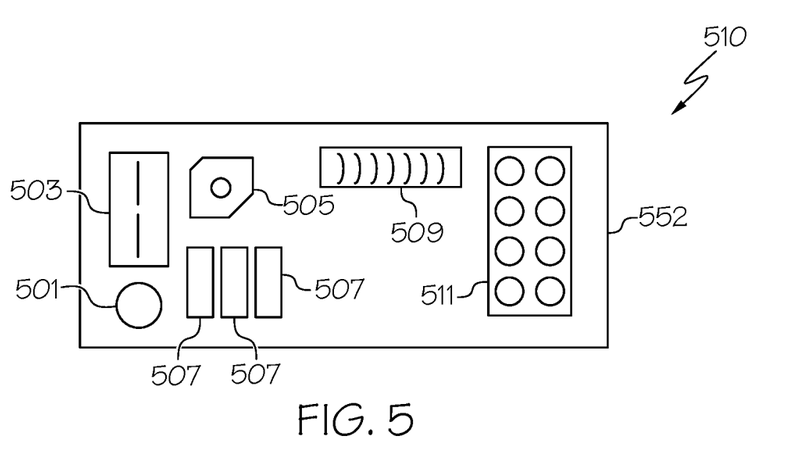
FIG. 5 is a view illustrating image data of a holding compartment of a robot having multiple items stored within according to one or more embodiments shown and described herein.

Turning to FIG. 5, a view representing image data of a holding compartment 552 of a robot 510 having multiple items stored within is depicted. In the embodiment depicted, the holding compartment 552 includes a can of soup 501, a frozen meal 503, a gallon of milk 505, three boxes of cereal 507, a loaf of bread 509, and a carton of eggs 511. This configuration may represent a configuration of items within a holding compartment 552 laid out by the robot 510 based on the image data of the holding compartment 552 and each of the associated set of handling instructions for the items within the holding compartment 552. For example, the robot 510 has configured the cold items, the frozen meal 503 and the gallon of milk 505 adjacent each other and the can of soup 501 secured in a corner by the boxes of cereal 507 and the frozen meal 503 to prevent the can from possibly rolling around the holding compartment 552 during transportation. Additionally, the loaf of bread 509 and the carton of eggs 511 are situated near each other and separated from the other heavier and potentially damaging items. Further embodiments may include stacking items on top of each other or within pre-segmented portions of the holding compartment 652 as depicted in FIG. 6, for example.

Figure 6:
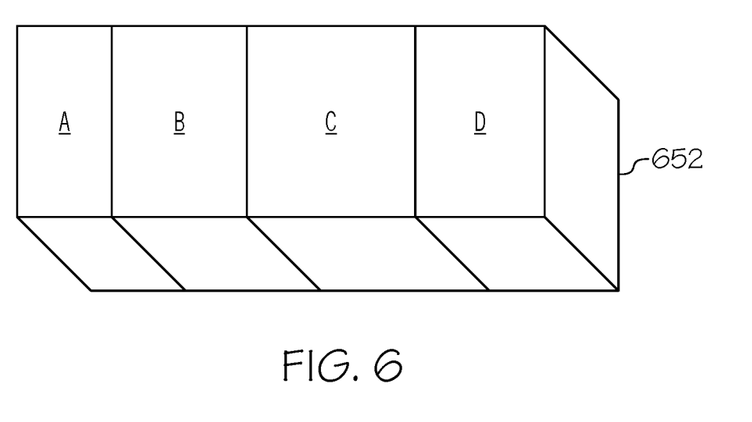
FIG. 6 is a view illustrating a holding compartment including four pre-segmented portions for holding specific classifications of items according to one or more embodiments shown and described herein.

Referring to FIG. 6, the holding compartment may include one or more pre-segmented portions. For example, the holding compartment 652 in FIG. 6 depicts pre-segmented portions A, B, C, and D. Each of the pre-segmented portions A, B, C, D of the holding compartment 652 may be designated by the electronic control unit 130 to hold a specific classification of items. For example, pre-segmented portion A may be configured to hold small and/or fragile items. Pre-segmented portion B may be configured to hold cold items and pre-segmented portion B may be structurally configured to insulate or actively cool the items placed therein. Pre-segmented portion C may be configured to hold room temperature items and pre-segmented portion D may be configured to hold warm items and further structured to insulate or actively warm the items placed therein. This is only one example of the designations placed on each of the pre-segmented portions. The pre-segmented portions may alternatively be configured to hold and separate food items, household cleaning products, clothes, and/or pet supplies from each other. Additionally, while four pre-segmented portions are depicted there may be more or fewer and the pre-segmented portions may vary in size and orientation.

The design of the holding compartment 652 may further depend on the type of store implementing the robot. For example, a hardware store may have larger more robust holding compartment 652 than a grocery store. In some embodiments, the holding compartment 652 may be a flatbed cart for use in a warehouse or packaging facility.

Figure 7:
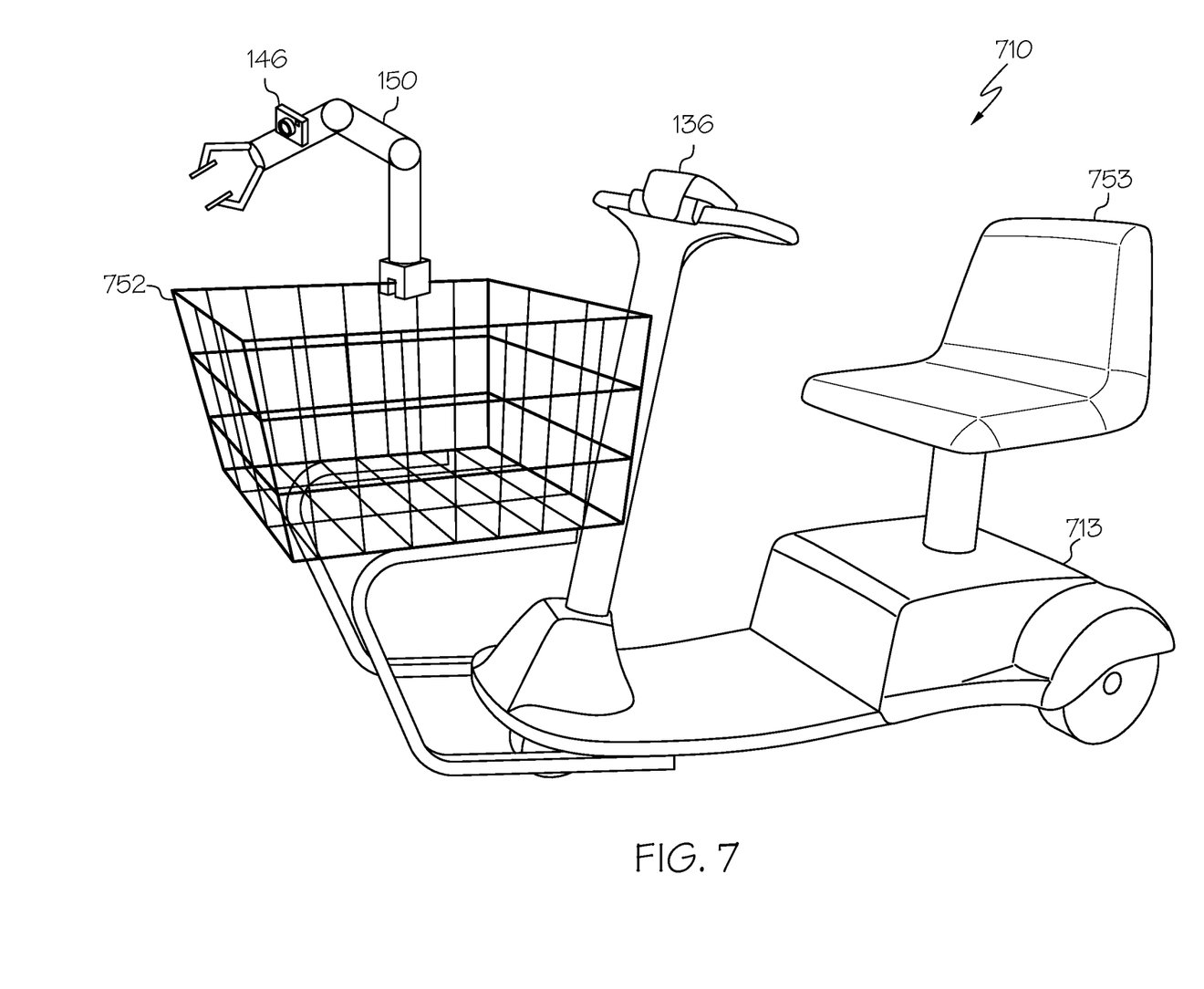
FIG. 7 is a view illustrating another robot configured with a motorized scooter base according to one or more embodiments shown and described herein.

FIG. 7 depicts yet a further embodiment of a robot 710. In FIG. 7, the robot 710 includes a holding compartment 752, a robotic arm 150 with one or more cameras 146 disposed thereon and a display 136 for interacting with the robotic arm 150 integrated into a motorized base 713, which provides a seat 753 for a user to sit while manually or autonomously navigating the aisles of a store. In similar embodiments, the robot 710 may simply provide a seat 753 the unfolds from or is coupled to the holding compartment 752 to provide a place for a user to sit and rest while shopping.

While the above examples describe the robot system as integrated with a shopping cart or motorized scooter base it should be understood that the holding compartment and robotic arm may be coupled to any mobile base that is or is not motorized. Additionally, a variety of sensors and systems for providing autonomous navigation may also be integrated as known in the art to facilitate autonomous or semi-autonomous movement of the robot about a facility.

It should now be understood that embodiments described herein are directed to robot systems that include an electronic control unit and a holding compartment configured to transport one or more items. The electronic control unit includes a processor and a non-transitory computer readable memory including a machine-readable instruction set. The robot systems further include a camera for capturing image data of an environment of the holding compartment and a robotic arm each communicatively coupled to the electronic control unit. The machine-readable instruction set causes the processor to receive image data of the environment of the holding compartment from the camera, determine a set of handling instructions for an item collected by the robotic arm, determine a location within the holding compartment for placing the item collected by the robotic arm based on the image data of the environment of the holding compartment and the set of handling instructions, and manipulate the robotic arm to place the item within the holding compartment at the determined location. In some embodiments, the holding compartment and the robotic arm are coupled to a motorized base such that the robot system may autonomously or semi-autonomously move about a facility. It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A robot system comprising:
   an electronic control unit comprising a processor and a non-transitory computer readable memory;
   a holding compartment configured to transport one or more items;
   a camera communicatively coupled to the electronic control unit for capturing image data of an environment of the holding compartment; and
   a robotic arm communicatively coupled to the electronic control unit, wherein the electronic control unit is configured to:
     receive image data of the environment of the holding compartment from the camera,
     determine a set of handling instructions for an item collected by the robotic arm based on one or more attributes of the item, wherein the set of handling instructions define at least one of a handling or a storing requirement for the item,
     determine a location within the holding compartment for placing the item collected by the robotic arm based on the image data of the environment of the holding compartment and the set of handling instructions, and
     manipulate the robotic arm to place the item within the holding compartment at the determined location.

2. The robot system of claim 1, wherein the camera further captures image data of a gesture and the electronic control unit is further configured to:
   determine the meaning of the gesture, and
   convert the meaning of the gesture into one or more signals for maneuvering at least the robotic arm.

3. The robot system of claim 1, wherein one or more handling instructions of the set of handling instructions is based on a classification for the item and one or more handling instructions of the set of handling instructions specify one or more other classifications of items to store separately from the item.

4. The robot system of claim 1, wherein the electronic control unit is further configured to:
   receive a shopping list comprising a list of one or more items for the robotic arm to collect.

5. The robot system of claim 4, wherein the electronic control unit is further configured to:
   determine an order for collecting the one or more items on the shopping list based on the set of handling instructions for each of the one or more items on the shopping list.

6. The robot system of claim 4, wherein the holding compartment and the robotic arm are coupled to a motorized base and the motorized base is communicatively coupled to the electronic control unit, and the electronic control unit is further configured to:
   determine a route to a location for at least one item on the shopping list,
   generate one or more signals to manipulate the motorized base to the location for the at least one item on the shopping list, and
   generate one or more signals to manipulate the robotic arm to collect the item on the shopping list.

7. The robot system of claim 1, further comprising a barcode scanner disposed on the robotic arm and communicatively coupled to the electronic control unit.

8. The robot system of claim 7, wherein at least one of the barcode scanner and the camera communicate signals indicative of a barcode of the item to the electronic control unit, and the electronic control unit is further configured to:
   determine an identification of the item, and
   add the item to an electronic checkout list.

9. The robot system of claim 1, wherein the holding compartment comprises a plurality of segmented compartments and at least one or the plurality of segmented compartments comprises at least one of a cold storage compartment and a warm storage compartment.

10. The robot system of claim 1, wherein the holding compartment includes removable grocery bags.

11. A robot system comprising:
    an electronic control unit comprising a processor and a non-transitory computer readable memory;
    a holding compartment configured to transport one or more items;
    a camera communicatively coupled to the electronic control unit for capturing image data of an environment of the holding compartment;
    a robotic arm communicatively coupled to the electronic control unit and rotatably coupled to the holding compartment; and
    a motorized base coupled to the robotic arm and the holding compartment, wherein the electronic control unit is configured to:
      receive image data of the environment of the holding compartment from the camera,
      receive image data of an item to be collected from the camera,
      determine a set of handling instructions for the item based on the image data of the item received from the camera and on one or more attributes of the item, wherein the set of handling instructions define at least one of a handling or a storing requirement for the item,
      determine a location within the holding compartment for placing the item collected by the robotic arm based on the image data of the environment of the holding compartment and the set of handling instructions, and
      manipulate the robotic arm to position the item within the holding compartment at the determined location.

12. The robot system of claim 11, wherein the camera further captures image data of a gesture and the electronic control unit is further configured to:
    determine the meaning of the gesture, and
    convert the meaning of the gesture into one or more signals for maneuvering at least the robotic arm.

13. The robot system of claim 11, wherein one or more handling instructions of the set of handling instructions is based on a classification of the item and one or more handling instructions of the set of handling instructions specify one or more other classifications of items to store separately from the item.

14. The robot system of claim 11, wherein the electronic control unit is further configured to:
    receive a shopping list comprising a list of one or more items for the robotic arm to collect, and
    determine an order for collecting the one or more items on the shopping list based on the set of handling instructions for each of the one or more items on the shopping list.

15. The robot system of claim 11, wherein the holding compartment and the robotic arm are coupled to a motorized base and the motorized base is communicatively coupled to the electronic control unit, and the electronic control unit is further configured to:
    receive a shopping list comprising a list of one or more items for the robotic arm to collect, determine a route to a location for at least one item on the shopping list, generate one or more signals to manipulate the motorized base to the location for the at least one item on the shopping list, and generate one or more signals to manipulate the robotic arm to collect the item on the shopping list.

16. A method for storing an item, the method comprising:

receiving image data of an environment of a holding compartment from a camera;

determining a set of handling instructions for an item collected by a robotic arm based on one or more attributes of the item, wherein the set of handling instructions define at least one of a handling or a storing requirement for the item;

determining a location within the holding compartment for placing the item collected by the robotic arm based on the image data of the environment of the holding compartment and the set of handling instructions; and manipulating the robotic arm to position the item at the determined location within the holding compartment.

17. The method of claim 16, wherein the step of determining the set of handling instructions further comprises receiving the set of handling instructions from a database of handling instructions.

18. The method of claim 16, further comprising:
receiving image data of a gesture from the camera,
determining the meaning of the gesture, and
converting the meaning of the gesture into one or more signals for maneuvering at least the robotic arm.

19. The method of claim 16, wherein one or more handling instructions of the set of handling instructions is based on a classification of the item and the one or more handling instructions of the set of handling instructions specify one or more other classifications of items to store separately from the item.

20. The method of claim 16, further comprising
receiving a shopping list comprising a list of one or more items for the robotic arm to collect, and
determining an order for collecting the one or more items on the shopping list based on the set of handling instructions for each of the one or more items on the shopping list.

\* \* \* \* \*